US011493758B2

(12) United States Patent
Schwartze et al.

(10) Patent No.: US 11,493,758 B2
(45) Date of Patent: Nov. 8, 2022

(54) DISPLAY DEVICE, IN PARTICULAR FOR VEHICLE, AND VEHICLE HAVING DISPLAY DEVICE WITH VOLUME HOLOGRAM

(71) Applicant: AUDI AG, Ingolstadt (DE)

(72) Inventors: Sebastian Schwartze, Ingolstadt (DE); Markus Klug, Ingolstadt (DE); André Schwager, Ingolstadt (DE); Muhammad Ali Kezze, Aachen (DE)

(73) Assignee: AUDI AG, Ingolstadt (DE)

( * ) Notice: Subject to any disclaimer, the term of this patent is extended or adjusted under 35 U.S.C. 154(b) by 246 days.

(21) Appl. No.: 16/651,016

(22) PCT Filed: Sep. 20, 2018

(86) PCT No.: PCT/EP2018/075496
§ 371 (c)(1),
(2) Date: Mar. 26, 2020

(87) PCT Pub. No.: WO2019/063415
PCT Pub. Date: Apr. 4, 2019

(65) Prior Publication Data
US 2020/0271928 A1 Aug. 27, 2020

(30) Foreign Application Priority Data

Sep. 27, 2017 (DE) ............... 10 2017 217 193.6

(51) Int. Cl.
*G02B 27/01* (2006.01)
*B60R 1/00* (2022.01)
*B60K 35/00* (2006.01)

(52) U.S. Cl.
CPC .......... *G02B 27/0103* (2013.01); *B60K 35/00* (2013.01); *B60R 1/001* (2013.01);
(Continued)

(58) Field of Classification Search
CPC ........ G02B 27/0103; G02B 2027/0109; B60R 1/001; B60K 35/00; B60K 2370/1531
See application file for complete search history.

(56) References Cited

U.S. PATENT DOCUMENTS

| 9,651,368 B2 | 5/2017 | Abovitz et al. | |
| 2011/0176190 A1* | 7/2011 | Golan | G03H 1/08 |
| | | | 359/9 |

(Continued)

FOREIGN PATENT DOCUMENTS

| CN | 102656501 A | 9/2012 |
| CN | 103140791 A | 6/2013 |

(Continued)

OTHER PUBLICATIONS

Japanese Office Action dated Feb. 24, 2021, in Japanese Patent Application No. 2020-517568 (2 pages).

(Continued)

*Primary Examiner* — Kwang-Su Yang
(74) *Attorney, Agent, or Firm* — Staas & Halsey LLP

(57) ABSTRACT

A volume hologram is arranged inside a transparent portion of a pane of a display device for a vehicle. The display device further includes a light source by which light is coupled into the volume hologram. An image appearing three-dimensional to a human observer can be generated by use of the volume hologram. A camera includes a light-sensitive image sensor to acquire images via an optical unit which is at least partially formed by the transparent portion of the pane.

18 Claims, 3 Drawing Sheets

(52) U.S. Cl.
CPC ............... *B60K 2370/1531* (2019.05); *G02B 2027/0109* (2013.01)

(56) References Cited

U.S. PATENT DOCUMENTS

| | | | |
|---|---|---|---|
| 2013/0182302 A1 | 7/2013 | Shikii et al. | |
| 2015/0177591 A1 | 6/2015 | Sugiyama et al. | |
| 2015/0185475 A1 | 7/2015 | Saarikko et al. | |
| 2015/0234477 A1 | 8/2015 | Abovitz et al. | |
| 2015/0277375 A1 | 10/2015 | Large et al. | |
| 2016/0209657 A1 | 7/2016 | Popovich et al. | |
| 2017/0168566 A1 | 6/2017 | Osterhout et al. | |
| 2018/0172981 A1* | 6/2018 | Ishii | G02B 5/32 |
| 2020/0174284 A1* | 6/2020 | Chan | G02B 27/0179 |

FOREIGN PATENT DOCUMENTS

| | | |
|---|---|---|
| CN | 104204904 A | 12/2014 |
| CN | 104395815 A | 3/2015 |
| CN | 104656259 A | 5/2015 |
| CN | 105849621 A | 8/2016 |
| CN | 106659541 A | 5/2017 |
| CN | 106662685 A | 5/2017 |
| DE | 10 2011 083 662 A1 | 4/2013 |
| DE | 10 2013 210 887 A1 | 12/2014 |
| DE | 10 2014 204 691 A1 | 9/2015 |
| DE | 10 2015 116 408 A1 | 3/2017 |
| DE | 10 2017 217 193.6 | 9/2017 |
| EP | 3180647 B1 | 11/2019 |
| GB | 2 368 403 A | 5/2002 |
| KR | 10-2016-0102481 | 8/2016 |
| WO | 2017/060665 A1 | 4/2007 |
| WO | 2010/057219 A1 | 5/2010 |
| WO | 2012/042793 A1 | 4/2012 |
| WO | 2014/156167 A1 | 10/2014 |
| WO | 2015/012280 A1 | 1/2015 |
| WO | 2016/025350 A1 | 2/2016 |
| WO | PCT/EP2018/075496 | 9/2018 |

OTHER PUBLICATIONS

International Search Report dated Dec. 20, 2018 from International Application No. PCT/EP2018/075496, 4 pages.
European Search Report dated Jan. 21, 2022 in European Patent Application No. 21200628.2.

\* cited by examiner

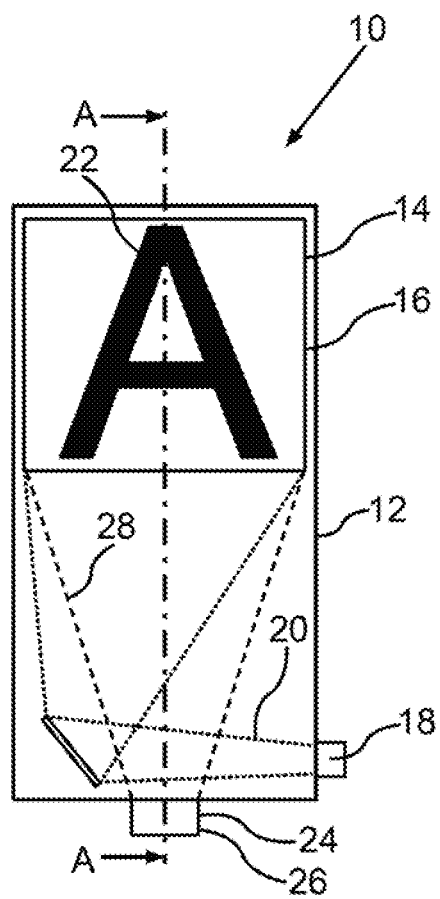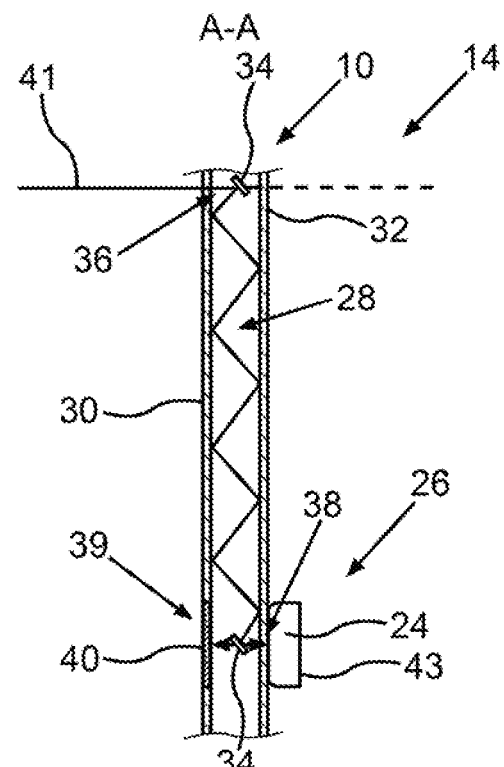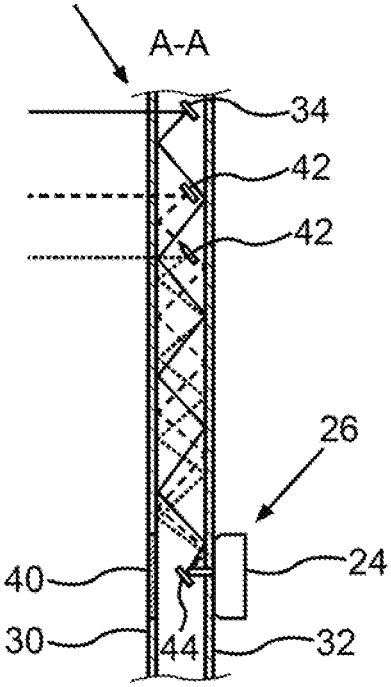
Fig.1
Fig.2
Fig.3

DISPLAY DEVICE, IN PARTICULAR FOR VEHICLE, AND VEHICLE HAVING DISPLAY DEVICE WITH VOLUME HOLOGRAM

CROSS REFERENCE TO RELATED APPLICATIONS

This application is a U.S. national stage of International Application No. PCT/EP2018/075496, filed on Sep. 20, 2018. The International Application claims the priority benefit of German Application No. 10 2017 217 193.6 filed on Sep. 27, 2017. Both International Application No. PCT/EP2018/075496 and German Application No. 10 2017 217 193.6 are incorporated by reference herein in their entirety.

BACKGROUND

Described herein is a display device, for example for a vehicle. Also described herein is a vehicle having such a display device.

Current vehicles have a large number of auxiliary functions, whereby a driver can rapidly lose an overview and his concentration with respect to the road traffic can thus become lower. In addition, multimedia functions, which are to be used for example when the vehicle is stationary, are becoming more and more important. In addition, for driver assistance systems installed in current vehicles, an environmental acquisition is decisive for correct functioning of the respective driver assistance system.

To make items of information about a state of the vehicle and the auxiliary functions accessible to the driver as well as possible, current vehicles are sometimes equipped with a so-called head-up display (HUD), which enables a driver of the vehicle to maintain his line of sight and to have items of information relating to a state of the vehicle, for example, the speed, projected directly into his field of view. The driver of the vehicle thus does not have to turn his view away from the roadway, which can enhance traffic safety, for example.

German Patent Application No. 10 2011 083 662 A1 describes a display device for occupants of a vehicle, wherein the display device includes a holographic projection surface, which is embodied as transparent from the viewpoint of the occupants in the installed state of the display device and light, which is decoupled from a light guide, is used to generate a display for the occupants.

German Patent Application No. 10 2013 210 887 A1 describes an optical sensor arrangement for a vehicle, wherein the optical sensor arrangement includes a sensor device for absorbing optical radiation from a vehicle environment and at least one optical element, wherein the optical element is arranged in a beam path of the sensor device and forms an imaging system with the sensor device, for imaging the optical radiation on the sensor device.

Furthermore, German Patent Application No. 10 2014 204 691 A1 describes an image recording device, for example for vehicle measurement, having at least one image sensor, which is designed for recording images from an image recording direction, including at least one light source and at least one light deflection element, which is designed and arranged in such a way that it deflects a light beam originating from the light source in such a way that the light beam exits coaxially to the image recording direction from the image recording device.

The disadvantages of the related art are, for example, the required installation space and a strongly limited respective area of use.

SUMMARY

Described herein are a display device and a vehicle having the display device, so that a particularly advantageous functionality can be provided.

This is achieved by a display device having at least some of the features described herein and by a vehicle having the display device. Advantageous refinements are also described by the following description, and the drawings.

A display device, for example for a vehicle, includes at least one pane having at least one volume hologram arranged at least inside a transparent portion of the pane and at least one light source, by use of which light can be coupled into the volume hologram. At least one image appearing three-dimensional to a human observer can be generated from the light provided by the light source by use of the volume hologram.

To be able to operate the display device with a particularly advantageous functionality, the display device includes at least one camera device including at least one light-sensitive image sensor, the optical unit of which, via which images are acquirable by use of the image sensor, is at least partially formed by the portion.

An acquired or acquirable image is also referred to as a recorded image or acquired image. The acquisition of the image is also referred to as the recording of the image, which is to be understood to mean that the image is acquired by use of the image sensor. The image which can be generated is displayed when it is generated and is thus a generated and therefore displayed image. The at least one image which is displayed and/or able to be generated or generated is also referred to as a display image. In this case, the portion which at least partially forms the optical unit is also referred to as the acquisition region or recording plane. The optical unit is to be understood as the part of the camera device which can also be referred to as an objective and collects light in such a way that an optical image, which is real in particular, of an image motif can be generated by use of the acquired image. In this case, for example the volume hologram arranged on the portion characterizes the optical unit of the camera device.

The volume hologram is, for example, arranged in the pane in such a way that it is located between a first part of the pane and a second part, for example it is embedded between two layers of the pane and forms a waveguide together with the layers. This waveguide is also referred to as a holographic waveguide and is, for example, designed in such a way that it can guide light of at least one specific wavelength or one specific wavelength range within its volume. The guiding of the light in the waveguide takes place similarly to the guiding of light in a light guide by use of total reflection. The portion which forms the so-called recording plane by use of the optical unit, is transparent to the observer at least for the wavelength range of the light which cannot be guided in the waveguide. Transparent is to be understood to mean that an object, for example, the pane or its portion, appears transparent at least for a large part of the visible light or the spectrum of the visible light, or transmission of light through the object is possible for a large part of the visible spectrum. In order that the pane can be formed to be as transparent as possible, the at least one volume hologram is formed in such a way that only a defined spectrum of the light is deflected by the volume hologram, in order to be transported by use of the volume hologram in particular. Thus, for example, light which is required for acquiring the image can be conducted away from the portion of the pane which is used as the optical unit. The transportation can be possible for example only for individual defined light wavelengths of the spectrum, while in contrast the remainder of the light spectrum is not transported away but rather transmitted.

A laser or a laser scanner and/or diodes, for example having a defined wavelength, can be used as the light source for the display of the image, for example. Alternatively or additionally, a projector can be used as the light source. The optical function differs, however, so that an optical function for DLP or LCD projector could not be used with laser projectors. In this case, the light source for a display can be arranged in such a way that a light supply of the light of the light source takes place outside a field of view of an observer, for example, the driver or another user of the vehicle. To make the light supply as efficient as possible, a distance between light source and pane should be kept as small as possible. Furthermore, a movement between medium, i.e., the pane and the light source should be as small as possible, for this purpose the light source can be fixedly connected to the pane.

To conduct light onto the light-sensitive image sensor of the camera device, so that the acquired image is acquirable by the display device, the optical unit of the camera device is at least partially formed by the portion, within which the volume hologram is arranged. Alternatively or additionally, the option exists that multiple volume holograms are arranged inside the transparent portion of the pane, wherein in each case at least one volume hologram can be used for generating the display image as a so-called image-generating plane and in each case at least one volume hologram can be used for the acquisition of the acquired image as an acquisition region. Respective different areas can also each be used as an optical unit within the portion, wherein in each case one area is respectively associated with one image sensor of the camera device, so that multiple image acquisitions are possible, for example from various recording angles. By way of the display device, for example using the at least one volume hologram, by use of the at least one display image, objects are not only displayable appearing three-dimensionally for a user, but rather also acquirable three-dimensionally by use of at least one acquired image. It is advantageous with regard to reliability that the display device helps to avoid a variety of components, which is additionally also noticeable in the costs.

The three-dimensional display is, for example, not readily achievable by use of a waveguide. For this purpose, multiple depth planes would be necessary and/or a holographic projection. A particularly significant advantage described herein is removing the display and recording element from the field of view, for example of the driver, by installing them in a doorframe, for example.

Aspects of the disclosure are based for example on the following finding: current vehicles are sometimes equipped with a so-called head-up display (HUD), which enables a driver of the vehicle to maintain his viewing direction and to have items of information relating to a state of the vehicle, for example, the speed, projected directly into his field of view. The driver of the vehicle thus does not have to turn his view away from the roadway, which can enhance traffic safety, for example. One disadvantage of this technology is that it is not possible, for example, to display 3D contents physically correct with items of depth information. Rather, a 3D effect has to be imitated, for example, by tracking the eye movement of the observer. A further disadvantage of a HUD is the required installation space.

Alternatively to a HUD, attempts are presently made to have items of information visually displayed to the driver of the vehicle in his field of view by use of affixed OLED elements, non-illuminated LCD films, SED displays, cast LEDs, and semitransparent surfaces. One disadvantage of the mentioned options is that the image plane corresponds to the image-generating plane, which can result in problems in focusing in the case of a close observation distance. Eyes of the driver thus have to change their focus upon a change from the generated image to the roadway, which can have a negative effect, for example, when recognizing hazardous situations. Furthermore, the transparency and the heat resistance are a problem in the case of the LCD films and OLED elements. The long lifetime of OLEDs and SEDs is also not advantageous, measured on the basis of the lifetime of a vehicle. Furthermore, the physical resolution and the flexibility, and also the trimming options and control of the mentioned display technologies are not ideal for use in a vehicle.

In addition, vehicles frequently include camera systems which are used, for example, for environmental acquisition. For some applications, it can be reasonable to arrange a camera, for example, for a desired and/or required recording angle, in such a way that its optical unit would be located, for example, in the field of view of the observer, for example the driver. There are approaches for integrating cameras into displays, which analyze the pixels directly, set them to sub-pixels, or integrate a camera into a display surface. This is disadvantageous for the driver of the vehicle, since his field of view can be negatively affected by the integration of the camera, for example.

In one advantageous design described herein, the volume hologram includes optical elements, by use of which light, which is incident in the pane at at least one first point, is to be conducted to at least one second point, different from the first point, at which the light can be decoupled from the pane. The path which the light covers in this case can be traversed in the opposite direction, i.e., the light can be coupled in at the at least one second point and can be decoupled at the at least one first point. Light which is incident in the pane and/or the volume hologram can now advantageously be coupled therein by the optical elements at the respective points, so that the coupled-in light is transported within the volume hologram. If the light is located in the volume hologram in such a way that it quasi-propagates inside the volume hologram, for example, by way of procedures similar to total reflection, it can be decoupled at the second point by use of a further optical element, this can be provided for defined wavelengths of the light. A respective optical element, which can also be referred to as an optical function, can thus be used as a coupling element and/or decoupling element of the light. In other words, the optical element can modify a light beam in such a way that it can at least change its direction at the optical element. The light beam incident on the optical element from outside the pane is thus coupled therein and the light beam moving inside the pane, upon incidence on the optical element, is deflected out of the pane thereby, i.e., decoupled.

In one advantageous design described herein, the light provided by the light source can be coupled into the pane at the first point. In other words, the first point, which is formed for example by the optical element, forms an interface, at which light is coupled or can be coupled into the volume hologram. To now couple the light of the light source, in particular for a subsequent display of the display image, into the pane and/or the volume hologram, the light source is connectable in a light-conducting manner to the first point, for example for the wavelength range of the light radiated or provided by the light source.

In one advantageous design described herein, the light decoupled out of the pane at the second point is acquirable by use of the image sensor. In other words, the second point, which is formed for example by the optical elements, forms a further interface, at which light can be decoupled from the volume hologram. To now guide the light exiting from the pane and/or the volume hologram for acquisition of the image by use of the camera device onto the image sensor, it is connectable in a light-conducting manner to the second point.

By way of the two mentioned interfaces and optical elements, it is particularly advantageously possible to use the volume hologram both for displaying display images and also for acquiring acquired images. The arrangement of the optical elements can characterize a resolution of respectively the display image and respectively the acquired image. The advantage results due to the optical elements that the light can be coupled in, for example, at a point at which the pane is formed as an optical unit and can be decoupled at the second point and can be supplied to the image sensor. Furthermore, the light of the light source can be coupled in at at least one of the at least one first points and decoupled at at least one of the at least one second points, in order to generate an image, which for example appears three-dimensional to a human observer. The image is on an image plane in space, but is not "three-dimensional". This means that it cannot be observed from multiple viewing angles. This is conceivably like a transparent film, which is located in front of or behind a glass pane.

In a further advantageous design described herein, the portion forms the entire optical unit of the camera device. In other words, no components and/or optical units are required for the acquisition of the image by use of the image sensor other than the portion of the pane having the volume hologram arranged therein. This means the portion of the pane is formed in such a way that it can absorb light, which is emitted from objects and/or the respective image motif in front of and/or behind the pane and is incident on the portion of the pane, in such a way, and can emit it at the image sensor of the camera device that the light illuminates the image sensor in such a way that the camera device records an image which shows the objects in front of and/or behind the pane.

In a further design described herein, the image sensor is arranged directly on the pane and touches it directly. The image sensor is, for example, arranged at the second point of the pane, at which the optical elements decouple light, in such a way that it can directly acquire the decoupled light, without using, for example, a further light guide, this has the advantages, for example, that disruptions because of an increased component number can be kept small and installation space can be saved.

In one advantageous design described herein, the pane is provided on a side opposite to the image sensor with a reflection layer arranged overlapping with the image sensor. Alternatively or additionally, the use of a light-absorbing layer is conceivable. Either more light can thus be reflected or scattered light can be prevented. The reflection layer can reflect, for example, light which is decoupled for example at the second point, at the location of the image sensor, out of the pane and/or the volume hologram, and guide it into the image sensor. By way of a suitable alignment, the reflection layer conducts light which is incident on the reflection layer at a corresponding point onto the image sensor at which the light would be incident thereon if it had exited from the pane directly on the side facing toward the image sensor. The amount of light incident on the image sensor is thus increased, whereby a quality of the acquired image can be enhanced. Furthermore, the reflection layer reduces an incidence of, for example, scattered light, which further enhances the quality of the acquired image. In addition, the reflection layer can alternatively or additionally be arranged on a side of the pane opposite to the light source, for example overlapping with the light source, wherein a light intensity of the display image can thus be enhanced.

In one advantageous design described herein, the volume hologram is formed by at least one film arranged inside the pane. Thus, for example, a first layer of the pane can be adhesively bonded with the film, on which a second layer of the pane is adhesively bonded, so that, for example, a so-called sandwich structure is formed. By use of the film, the volume hologram can be arranged particularly simply and therefore cost-effectively at and/or in the pane. Furthermore, the pane can be two-dimensionally and three-dimensionally curved due to the use of the film. In addition, simple stacking of multiple volume holograms is possible.

In one advantageous design described herein, the pane is formed as a side window or windscreen of the vehicle. If the pane is formed, for example, as a side window, it can be integrated into a door opening system, so that the driver or an owner of the vehicle is acquired when entering the vehicle by use of the optical unit of the camera device formed by the at least one portion. In return, the driver can receive optical feedback on an image plane in front of or behind the pane, which informs him that the vehicle has been opened. In this case, the image plane is the plane in which the display image appears to the observer, thanks to the display device, it is independent of the image-generating plane. If the pane of the display device is formed as the windscreen, in contrast, the driver can have, for example, important items of information relating to a state of the vehicle overlaid directly in his field of view. In addition, objects outside the vehicle can be acquired by the optical unit, for which additional items of information on the object can be overlaid by use of augmented reality directly at the position of the acquired object, for example without parallax errors.

The display device can be used for example in and/or for transparent plates, for example glass plates, outside vehicles, i.e., for any type of application.

Furthermore, it is conceivable that an option and/or device is provided for pixel-accuracy darkening of the pane, for example, via an LCD element, so that image contents can be displayed even in bright outside light. This is advantageous since image contents can only be displayed with limited brightness in a volume hologram and can thus be washed out relatively rapidly by the background.

In a further advantageous design described herein, the image is optically perceptible by the observer in at least one, for example virtual or real, image plane arranged in front of and/or behind the pane. It is possible that multiple image planes can be displayed by the at least one volume hologram of the display device. Therefore, different depths and/or effects can be generated. For example, a head of a person to be displayed could appear on an image plane located behind the image-generating plane from the viewpoint of the observer, the portion of the pane formed by the volume hologram, and arms of the person to be displayed could be imaged on an image plane located in front of the image-generating planes. In this case, the image plane located behind the image-generating plane can be referred to as a virtual plane and the image plane located in front of the image-generating plane, each viewed in the observation direction of an observer, can be referred to as a real plane.

Therefore, variable image contents can be imaged having three-dimensional depth by the volume hologram, in which the image plane for example does not correspond to the image-generating plane. Because the image plane, i.e., the plane in which the image is to be seen by the observer, does not have to coincide with the image-generating plane, but rather in particular can be farther away from the eye of the observer, the observation of the display image displayed by the display device does not result in a problem when focusing. Furthermore, a display of the contents of the image as a hologram is possible, however, 2D images having simulated depth are also possible. The option of the display device of having image contents appear in front of and also behind the pane may be used for the purpose of projecting objects into the space and/or displaying items of information, for example, in such a way that items of information which are displayed farther away from the observer are less relevant to the observer, whereby the observer is capable of more easily classifying the items of information.

In a further advantageous design described herein, the portion of the pane is additionally provided with an opaque switchable layer. This layer can be formed, for example, by an LCD film which can be darkened. It is thus possible to darken the pane on one side in such a way that no light which is located outside of the film can be incident through it, this can have the result, for example, that the background for the display is made calmer and/or the image is perceived more intensely and/or with higher contrast, for example, in bright environments. Furthermore, a respective image of a respective side of the pane can thus intentionally be recorded. The pane can also be used as a display screen by use of the switchable layer.

In the display device, the coupling in of the light from the light source, i.e., the image supply, can take place from an arbitrary side of the pane. By use of the properties of the volume hologram and/or the optical elements, processing of the supplied image can take place, for example, scaling and/or reflecting. Due to the use of the at least one volume hologram to acquire images by use of the camera device, for example the optical unit is not perceptible to the observer. The observer is thus capable, for example, of viewing a film undisturbed or looking through the pane. Furthermore, the pane can be used for video telephony. One of the advantages which the display device has in the case of video telephony is that the conversation partners could look at one another directly, since the image-generating plane and recording plane coincide, since no parallax occurs, for example, due to a camera installed above the image-generating plane.

Furthermore, multiple image sensors, for example having different recording methods and/or focal lengths, can be arranged at different points and even one over another. A simultaneous acquisition of different perspectives of an image motif is possible by using multiple optical units and multiple image sensors, so that inferences are derivable about its geometry and/or the space located in the recording direction. In addition, the camera device can acquire images on both sides of the pane. Thus, for example, an environmental acquisition can take place simultaneously with monitoring of the user, for example, the driver of the vehicle. Wherein the monitoring can be, for example, the recognition of pupil movements for so-called eye tracking.

The image-generating plane can be used as an optical unit and/or recording plane and thus as an objective opening, in which light enters, which is subsequently deflected by the optical elements and conducted to the image sensor. Furthermore, for example, different depths and/or effects may be generated by multiple recording planes in the pane. For example, different light spectra and/or perspectives can also be acquired and recorded.

A particularly compact structural form is possible by way of the use of the volume hologram for simultaneously recording displays of images using at least one camera device and at least one image-generating plane. Furthermore, an existing installation space can be used even more efficiently by the utilization of multiple image-generating planes and/or recording planes adjacent to one another and/or one behind another. The light source and/or the camera device are advantageously integrated directly into the pane.

Also described herein is a vehicle, for example a motor vehicle, for example, a passenger vehicle, having at least one display device as described herein. The disclosure also includes refinements of the vehicle, which includes features as have already been described in conjunction with the refinements of the display device. For this reason, the corresponding refinements of the vehicle are not described once again here.

BRIEF DESCRIPTION OF THE DRAWINGS

These and other aspects and advantages will become more apparent and more readily appreciated from the following description of the example embodiments, taken in conjunction with the accompanying drawings of which:

FIG. 1 is an example of a display device having a pane and a volume hologram arranged in a transparent portion of the pane and a light source and a camera device;

FIG. 2 is a lateral section through the pane of the display device according to FIG. 1;

FIG. 3 is a lateral section through the pane of an example of the display device;

DETAILED DESCRIPTION

Figure 4:
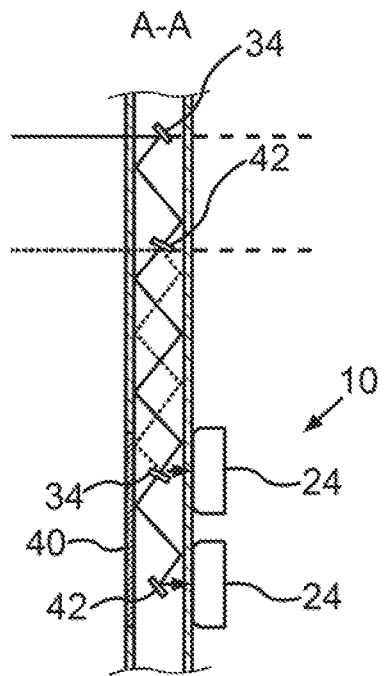
FIG. 4 is a lateral section through the pane of an example of the display device.

Reference will now be made in detail to various examples of which are illustrated in the accompanying drawings.

The examples explained hereafter are merely examples. In the examples, the described components of the embodiments each represent individual features to be considered independently of one another, which each also refine the disclosure independently of one another and are thus also to be considered to be a component of the disclosure individually or in a combination other than that shown. Furthermore, the described embodiments can also be supplemented by further ones of the above-described features described herein.

In the drawings, functionally-identical elements are each provided with the same reference signs.

FIG. 1 shows a first embodiment of a display device 10 for a vehicle, having at least one pane 12, having at least one volume hologram 16 arranged at least inside a transparent portion 14 of the pane 12, and having at least one light source 18, by use of which light 20 can be coupled or is coupled into the volume hologram 16. At least one image 22, which appears three-dimensional to a human observer, can be generated from the light 20 by use of the volume hologram 16. This means that the image 22 can be generated or is generated by use of the display device 10 and is thus displayed.

To now additionally enable an acquisition of at least one image by use of the display device 10 in addition to the display and/or a representation of the image 22, the display device 10 includes at least one camera device 26, including at least one light-sensitive image sensor 24, the optical unit 28 of which, via which images are acquirable by use of the image sensor 24, is at least partially formed by the portion 14.

The image sensor 24 is advantageously arranged directly on the pane 12 and touches it, whereby, for example, losses of light which is incident on the image sensor 24 are as small as possible. In addition thereto, in the embodiment shown the light source 18 is also arranged directly on the pane 12, whereby losses of the light 20 are also as small as possible. Due to the decoupling or coupling, respectively, of the light directly at the pane, additional light guides can be omitted, whereby costs can be saved.

An acquisition and display of at least one respective image can be carried out simultaneously by use of the display device 10 including the camera device 26. The at least one acquired or acquirable image is also referred to as a recorded image or acquired image, wherein the at least one displayed image or image to be displayed, for example, the image 22, is also referred to as a display image. In this case, an image-generating plane used for the display of the display image, which is formed by the portion 14 in which the volume hologram 16 is arranged, simultaneously forms the optical unit 28 and thus enables the acquisition of the recorded image. The advantage thus results that components can be saved, which can increase reliability and reduce costs.

The advantage of the display device 10 shown is that the pane 12 is transparent and furthermore can be used as such. Moreover, it is possible to generate and acquire three-dimensional contents by way of the use of the volume hologram 16. This means objects can be recorded and displayed three-dimensionally. Furthermore, an image motif for the acquired image can be illuminated directly by the display device 10.

FIG. 2 shows a lateral section along the A-A plane through the pane 12 of the display device 10 according to FIG. 1. In this case, the volume hologram 16 is arranged between a first layer 30 and a second layer 32 of the pane 12. In this case, the volume hologram 16 can be formed as at least one holographic film arranged inside at least one portion 14 of the pane 12. In these and the further embodiments, a holographic waveguide is formed by the two layers 30 and 32 and the volume hologram 16 embedded between these layers. Light beams propagate within the waveguide, similarly to a light guide, by total reflection. The holographic film can be provided with optical functions by use of a laser, for example. In this case, at least a part of the optical functions is formed as optical elements 34 (from FIG. 3 additionally 42, 44). These enable a modification of light beams, for example of specific, definable wavelengths. In this case, the modification can be, for example, a refraction, diffraction, and/or reflection of at least one light beam in dependence on its wavelength, whereby the optical element 34 can guide light beams. A light beam 41 which is incident in the pane 12 and at the same time is incident on the at least one optical element 34 is guided inside the volume hologram 16 in such a way that it is incident on a further optical element 34, at which it is decoupled from the pane 12 and guided onto the image sensor 24.

The optical element 34 can be designed so that it only conducts light of a specific wavelength range in the volume hologram 16, so that the volume hologram 16 and thus the waveguide or the pane 12 appears transparent to light of other wavelengths. An invisible integration into the pane 12 is possible due to this transparency.

Multiple optical elements 34 (cf. FIG. 5) are distributed at least over the portion 14 and thus over the image-generating plane and are designed for the purpose of decoupling light of the light source 18 from the waveguide, whereby the image 22 is displayable. The optical elements 34 used to display the display image can also be used to acquire the acquired image. Alternatively or additionally, multiple further optical elements 34, which are at least partially distributed and/or arranged over the portion 14, can be arranged and can at least partially form the optical unit 28 in such a way that it can couple light into the pane 12. In this case, the portion 14 of the pane which includes the optical elements 34, which at least partially form the optical unit 28 and couple the light into the pane 12, can be referred to as an acquisition plane. In other words, light which is incident in the pane at at least one first point 36, for example, the acquisition plane, can be conducted by use of the optical elements 34 to at least one second point 38 different from this first point 36, at which the light can be decoupled from the pane. The light is acquirable, for example, by use of the image sensor 24 at the second point 38.

For the acquisition or the capture of the image by the camera device 26, the optical unit 28 is formed by the portion 14 of the pane 12. To obtain the highest possible light yield in the acquisition of the acquired image by use of the image sensor 24, a reflection layer 40 is arranged on the pane 12 on the side 39 opposite to the image sensor in such a way that overlapping with the image sensor 24 is provided. A housing 43 of the camera device 16 can be adhesively bonded to the pane 12, for example, and can include freely movable image stabilizers in its interior, whereby a blurred recording can be prevented. Similarly thereto, the light source 18 can also be adhesively bonded and/or equipped with a further image stabilizer, a so-called anti-shake device. The image stabilizer can alternatively be implemented by use of software.

Due to the property of the holographic waveguide and/or the volume hologram 16 of being able to transport light, at least of a specific wavelength range, the image sensor 24 and/or the light source 18 is placeable outside a field of view.

Instead of the camera device 26 shown in FIG. 2, the light source 18 can be arranged at the point 38, so that the light beam 41 shown is emitted by the light source 18 and traverses the volume hologram 16 in the opposite direction and is thus decoupled at the point 36 from the pane 12. The portion 14 of the pane 12 at which the light 20 for generating the display image leaves the pane 12, i.e., is decoupled therefrom, is also referred to as an image-generating plane, wherein the image-generating plane coincides with the portion 14. The optical elements 34 and/or the image sensor 24 and/or the light source 18 can be designed in such a way that a common and/or simultaneous coupling and decoupling can take place at the point 36 and/or 38.

FIG. 3 shows a lateral section along the A-A plane through the pane 12 of an example embodiment of the display device 10. In comparison to the embodiment shown in FIG. 2, this embodiment includes further optical elements 42, which are designed to couple light of a respective different wavelength than the optical element 34 and the respective other optical element 42 into the pane 12. In contrast thereto, the optical element 44 is designed to decouple light of the three different wavelengths.

FIG. 4 shows a lateral section along the A-A plane through the pane 12 of an example embodiment of the display device 10. In contrast to the embodiment shown in FIG. 3, this embodiment does not have an optical element 44 which can deflect light of different wavelengths, but rather respective optical elements 34 for a first wavelength and optical elements 42 for a second wavelength. In this case, for example, the optical elements 34 can couple and/or decouple light in the infrared range and the optical elements 42 can decouple and/or couple light, for example, in the ultraviolet range. The light can thus be conducted in each case to an image sensor 24 which is respectively suitable for absorbing the light of the respective wavelength. Thus, for example, two different camera devices 26 can be used to separate different light spectra.

By using different optical functions and/or optical elements 34, 42, 44, bounded light spectra can be coupled and decoupled, whereby light may be transported in dependence on its wavelength or its wavelength range to different locations or points. Therefore, for example, respective images can be acquired using different camera devices 26, for example, for infrared and ultraviolet and/or visible light.

Figure 5:
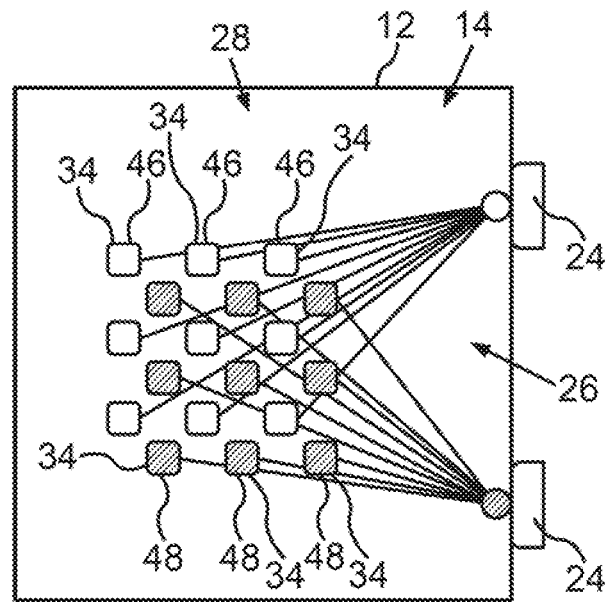
FIG. 5 is a detail of the pane according to an example including two image sensors of the camera device.

FIG. 5 shows a detail of the pane 12 according to an example embodiment, wherein the display device 10 includes two image sensors 24 of a camera device 26. The pixels 46 represented as light, which each include an optical element 34, represent a first optical unit 28 of the camera device 26 in this case. The pixels 48 represented as dark, which each again include an optical element 34, represent a second optical unit 28 of the camera device 26. The pixels 46 and 48 are arranged inside the portion 14 and each determine a resolution of the respective recorded image. By way of the two optical units 28, wherein one includes the pixels 46 and the other the pixels 48, respectively, two different perspectives result for the acquisition of an image motif, which overlap, however, whereby the two acquired images are slightly offset in relation to one another. This can be utilized, for example, for a later use of the images for effects.

Figure 6:
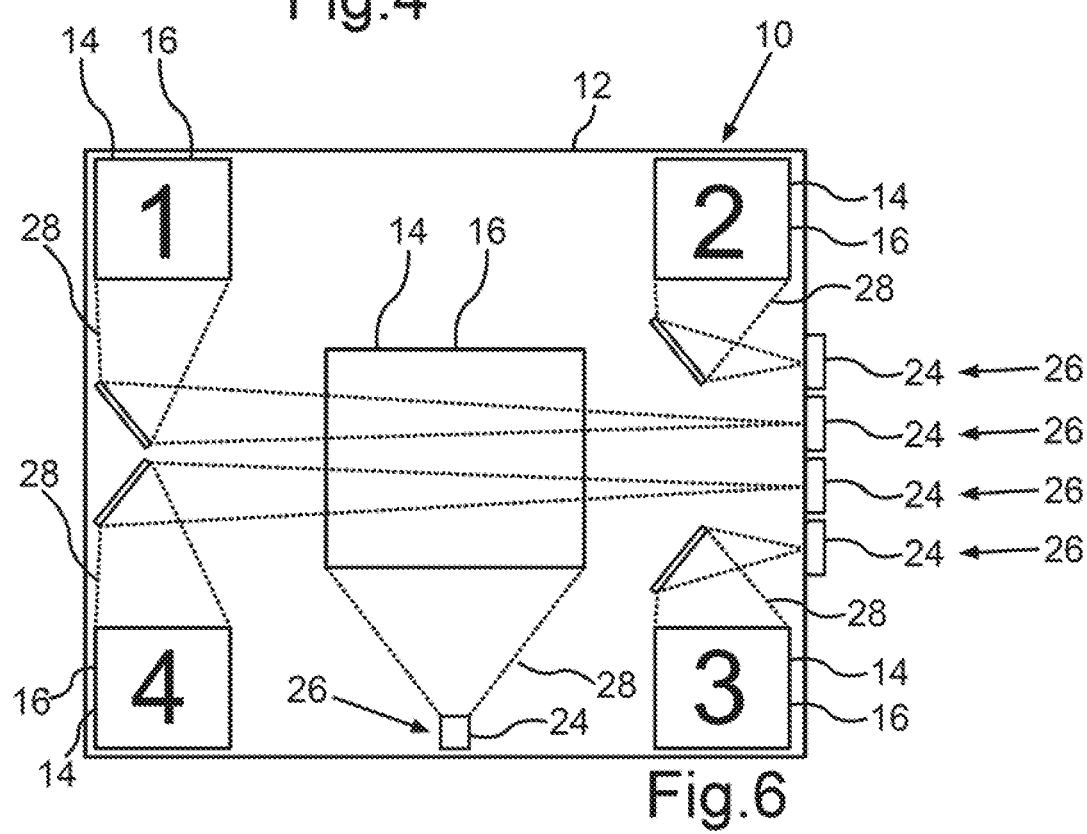
FIG. 6 is an example of the display device including multiple portions having respective volume holograms.

FIG. 6 shows an example embodiment of the display device 10, which includes multiple portions 14, wherein one volume hologram 16 is arranged at each portion 14. Each of these volume holograms 16 at least partially includes a respective optical unit 28 of a respective camera device 26, wherein the respective optical unit 28 is designed in such a way that it acquires light in the respective portion 14 of the pane 12 and respectively conducts it to an image sensor 24. In this case, four of the image sensors 24 are arranged on a narrow side of the pane 12 and the fifth image sensor 24 is arranged on a surface of the end face of the pane 12. In the embodiment shown, five different recording perspectives of an image motif are possible.

Figure 7:
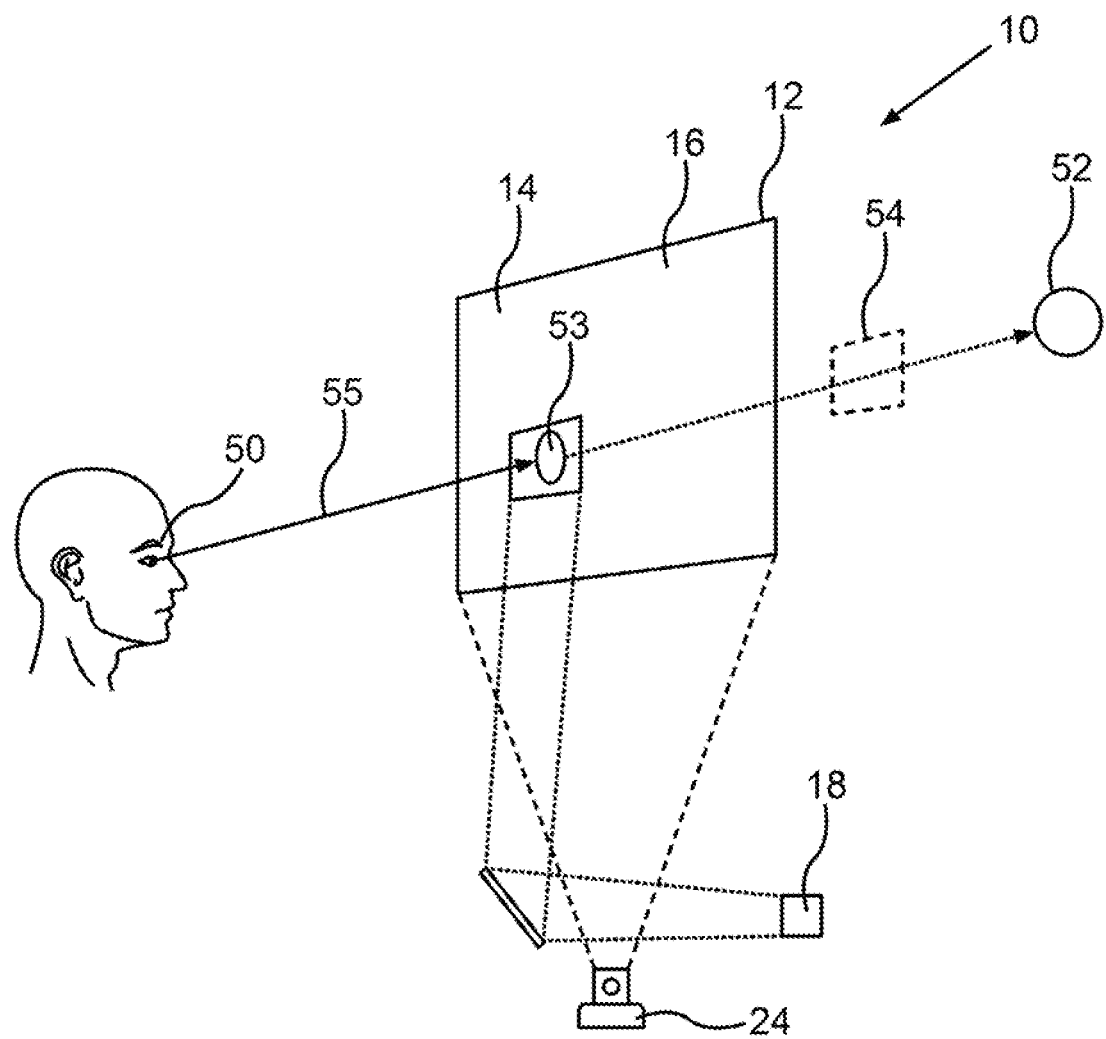
FIG. 7 is an example of the display device in a lateral perspective view.

FIG. 7 once again shows the example embodiment of the display device 10 from FIG. 1 in a lateral perspective view. An observer 50 is located here on a first side of the pane 12 and targets an object 52 on the second side of the pane 12 opposite to him. The portion 14 of the pane is designed so that at least one first acquired image is acquired on the first side of the pane 12, and that at least one second acquired image is acquired on the second side of the pane 12, which is opposite to the observer 50 and/or faces away from the first side. In the completely produced state of the vehicle, for example, the first side faces toward the interior of the vehicle, so that the second side faces away from the interior.

Due to acquisition of a position of the eyes of the observer 50, for example by use of the first acquired image, and due to the acquisition of the object 52, for example by use of the second acquired image, for example, an intersection point 53 between a sight beam 55 and the pane 12 can be computed, for example, by an electronic processing unit. This intersection point 53 is used for positioning a display of contents, for example, of a so-called augmented reality. These contents can be supplied by use of the light source 18 into the pane 12 and output in the portion 14 via the image-generating plane of the volume hologram 16. A virtual image 54 thus results for the observer 50, which appears to be located in an image plane perceptible by the observer outside the pane 12. However, an image can also be displayed on the side of the observer 50. Multiple different image planes may be implemented.

Recorded images are processed by the electronic processing unit. During this so-called image processing, for example, front and rear light beams, i.e., light which was absorbed on a respective side of the pane 12, can be separated and two separate images can be generated. Items of depth information can be obtained from these respective images either directly, for example, by light fields, or by subsequent computation, for example, by use of stereo methods. The data thus generated in turn provide the foundation for further computations, for example, a determination of the sight beam 55 from the observer 50 to the object 52. The intersection point 53 of this sight beam 55 with the optical medium, i.e., the pane 12, can be used to display contents as shown, for example, to place a frame around the object as in the image 54. Furthermore, the option is provided by the option of acquiring images simultaneously on both sides of the pane 12 that a fixed relationship between image elements on both sides already exists upon the image recording, for example, by a vector through the respective acquisition point of the respective pixels 46, 48 on the acquisition plane. Important inferences for subsequent image processing can thus be drawn, for example, a separation of the superimposed images and/or an image analysis, for example, the recognition of objects.

The particularly pre-definable wavelength or wavelength ranges which are transmitted through the pane have an influence on the transparency of the pane 12. It can therefore be advantageous that if, for example, only monitoring of the pupils is to be acquired to recognize the viewing direction, light in the infrared wavelength range is used for this purpose, so that a transparency of the pane 12 in visible light is not changed.

Overall, the examples of the different embodiments show how a three-dimensional image acquisition is implemented by use of the display device 10 including at least one camera device 26, wherein instead of a known objective, at least one optical unit 28 is formed from at least one volume hologram 16. In this case, the volume hologram 16 is formed inside the portion 14 of the pane 12. The holographic waveguide and/or the volume hologram 16 enables, in addition to an image sensor 24 which can be placed outside the field of view, the recording of different perspectives. In addition, a change of the acquired image motif can be performed by the optical elements 34, 42, 44, for example, by scaling, diffraction, or reflection, in such a way that electronic post-processing can be reduced.

The image output of the display image and the image recording of the acquired image can each be implemented via different light spectra and/or via multiple volume holograms 16, which are arranged adjacent to one another and/or one behind another, i.e., stacked. Diverse effects, for example, to represent different focal lengths or virtual image planes, may thus also be used. Furthermore, the respective focuses of the respective optical units 28 can be formed in such a way that the respective portion 14 corresponds to an acquisition in a different focal plane. Furthermore, by use of the different optical elements 34, 42, 44 and the use of image stabilizers, an image plane, an image format, and/or the resolutions can be changed. The display device 10 can thus be used as a type of mirror spinning top, the individual images of which from different perspectives result in a complete image.

If an extreme ratio of structural height to cross section of the pane 12 is selected, an extremely fast optical unit 28 can be implemented in a very small space. For example, if the portion 14 extends over the entire surface of the pane 12, the entire surface can be used as an objective opening. A particularly efficient weight reduction and thus also a cost reduction can thus take place, wherein a use of the display device 10 in fields of the aerospace industry also comes into consideration, for example.

In addition, in the case of a ratio "large pane 12—small image sensor 24", a small image sensor 24 can be operated so that it can provide the advantages of a larger image sensor, for example, a higher light absorption, a depth of field, and/or a large stereo width. It is thus also possible to use compact and slow image sensors, for example, of a smart phone, in critical areas.

Furthermore, the image sensor 24 no longer has to be installed at the desired recording position, whereby particularly flexible systems can be implemented or images can be made at locations where difficult environmental conditions prevail, for example, in an engine and/or in a furnace.

Further areas of use of the display device also include the following.

The optical elements 34, 42, 44 can be used, for example, as high-pass and/or low-pass filters and/or for a color shift. The pane 12 can be coated, for example, whereby it can be used as a mirror and/or monitor, a coating can also not reflect but can be opaque and may be switched on and off as such. So-called "structured light applications" can be provided by a combination of decoupling and coupling waveguides, in which the entire pane 12 is used as an output and input medium, whereby regions shadowed similarly to a so-called "area light" may be reduced. In addition, interfering images can be generated in a wavelength range not visible to the human eye, for example, to ensure an occupant protection and/or to warn animals, for example, birds, away from the pane 12. Furthermore, the pane 12 can be used as a flatbed scanner, for example by use of different focal planes of respective volume hologram 16. An image acquisition, for example, in the side window of the vehicle, can also be used for recognizing biometric features.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A display device, comprising:
a pane having a transparent portion, a side of the pane having a reflection layer;
a camera device including an image sensor configured to acquire images in an acquisition region formed by the transparent portion of the pane, the image sensor arranged on and in contact with another side of the pane directly opposite of the reflection layer;
a volume hologram including an optical element, arranged inside the transparent portion of the pane; and
a light source to provide light which is to be coupled into the volume hologram to generate an image appearing three-dimensional to a human observer via the volume hologram, the optical element decoupling a light beam corresponding to the light out of the pane and onto the image sensor.

2. The display device according to claim 1, wherein the volume hologram includes a plurality of optical elements by which the light beam, which is incident at at least one first point in the pane, is to be conducted to at least one second point, different from the first point, at which the light beam is decoupled from the pane.

3. The display device according to claim 2, wherein the light provided by the light source is coupled into the pane at the first point.

4. The display device according to claim 2, wherein the light beam decoupled out of the pane at the second point is acquirable by the image sensor.

5. The display device according to claim 1, wherein the image sensor includes a plurality of image sensors, and at least one image sensor among the plurality of image sensors is arranged on and in contact with a narrow side of the pane, and/or at least one image sensor among the plurality of image sensors is arranged on a surface of an end face of the pane.

6. The display device according to claim 1, wherein the volume hologram is formed by at least one film arranged inside the pane.

7. The display device according to claim 1, wherein the pane is formed as a side window or windscreen of a vehicle.

8. The display device according to claim 1, wherein the image is optically perceptible by the human observer in at least one image plane arranged in front of and/or behind the pane.

9. The display device according to claim 1, wherein the transparent portion is at least partially provided with an opaque switchable layer.

10. A vehicle, comprising:
a chassis; and
a display device, including:
a pane having a transparent portion, a side of the pane having a reflection layer;
a camera device including an image sensor configured to acquire images in an acquisition region formed by the transparent portion of the pane, the image sensor arranged on and in contact with another side of the pane directly opposite of the reflection layer;
a volume hologram including an optical element, arranged inside the transparent portion of the pane; and
a light source to provide light which is to be coupled into the volume hologram to generate an image appearing three-dimensional to a human observer via the volume hologram, the optical element decoupling a light beam corresponding to the light out of the pane and onto the image sensor.

11. The vehicle according to claim 10, wherein the volume hologram includes a plurality of optical elements by which the light beam, which is incident at at least one first point in the pane, is to be conducted to at least one second point, different from the first point, at which the light beam is decoupled from the pane.

12. The vehicle according to claim 11, wherein the light beam provided by the light source is coupled into the pane at the first point.

13. The vehicle according to claim 11, wherein the light beam decoupled out of the pane at the second point is acquirable by the image sensor.

14. The vehicle according to claim 10, wherein the image sensor is arranged directly on and in contact with the another side of the pane.

15. The vehicle according to claim 10, wherein the volume hologram is formed by at least one film arranged inside the pane.

16. The vehicle according to claim 10, further comprising:
   at least one of a side window or a windscreen,
   wherein the pane of the display device is formed as the at least one of the side window or the windscreen.

17. The vehicle according to claim 10, wherein the image is optically perceptible by the human observer in at least one image plane arranged in front of and/or behind the pane.

18. The vehicle according to claim 10, wherein the transparent portion is at least partially provided with an opaque switchable layer.

\* \* \* \* \*

UNITED STATES PATENT AND TRADEMARK OFFICE
CERTIFICATE OF CORRECTION

PATENT NO. : 11,493,758 B2
APPLICATION NO. : 16/651016
DATED : November 8, 2022
INVENTOR(S) : Sebastian Schwartze et al.

Page 1 of 1

It is certified that error appears in the above-identified patent and that said Letters Patent is hereby corrected as shown below:

In the Claims

Column 14, Line 14:
In Claim 2, delete "which the light beam" and insert --which the light--

Signed and Sealed this
Twenty-fifth Day of June, 2024

Katherine Kelly Vidal
*Director of the United States Patent and Trademark Office*